United States Patent [19]
Dorner et al.

[11] Patent Number: 5,809,077
[45] Date of Patent: Sep. 15, 1998

[54] CIRCUIT FOR SIGNAL-TRANSMITTING CONNECTION OF DATA NETWORKS

[75] Inventors: Juergen Dorner, Wendlingen; Holger Behrends, Hanover; Bernhard Rall, Ulm; Michael Schaefer, Allmendingen, all of Germany

[73] Assignees: Mercedes Benz AG, Stuttgart; WABCO Standard GmbH, Bonn; Daimler-Benz AG, Stuttgart, all of Germany

[21] Appl. No.: 790,829

[22] Filed: Jan. 30, 1997

[30] Foreign Application Priority Data

Jan. 30, 1996 [DE] Germany ............. 196 03 221.0

[51] Int. Cl.⁶ ............................................. H04B 10/24
[52] U.S. Cl. .................... 375/257; 370/287; 359/111; 359/113; 359/161; 359/173; 178/73; 379/407
[58] Field of Search ............................. 375/211, 213, 375/214, 219, 220, 224, 257, 258, 377; 370/241, 248, 276, 282, 286, 287, 296; 379/344, 406, 407, 410, 414, 416; 178/71.1, 73; 364/DIG. 1, DIG. 2; 359/111, 113, 152, 161, 173

[56] References Cited

U.S. PATENT DOCUMENTS 3,673,326  6/1972  Lee ............................... 178/71.1
3,832,489  8/1974  Krishna ........................ 178/71.1
3,912,884  10/1975  Membrino et al. .

FOREIGN PATENT DOCUMENTS 0 381 565  8/1990  European Pat. Off. .
41 06 726  9/1992  Germany .

*Primary Examiner*—Don N. Vo
*Assistant Examiner*—Amanda T. Le
*Attorney, Agent, or Firm*—Evenson, McKeown, Edwards & Lenahan, P.L.L.C.

[57] ABSTRACT

A circuit in which driver units are associated with data networks that are coupled through at least two single transmission channels is provided. The driver units have a logical signal input and a logical signal output on their sides facing away from the data network, with the signal input or signal output of one driver unit being connected with the signal output or signal input of the other driver unit through a signal transmission channel in each case for coupling each of two data networks. A logical coupling control unit is looped into the coupling signal transmission channels. The unit blocks the signal path to the other signal transmission channel when predetermined blocking signal information appears on one signal transmission channel. This ensures that feedback and oscillation effects are suppressed during the transmission of signals over the transmission channels. The circuit can be used for coupling CAN data networks in motor vehicles.

4 Claims, 2 Drawing Sheets

CIRCUIT FOR SIGNAL-TRANSMITTING CONNECTION OF DATA NETWORKS

BACKGROUND AND SUMMARY OF THE INVENTION

The invention relates to a circuit for a signal-transmitting, especially lead-connected, coupling of data networks and, more particularly, to a circuit for coupling data networks over at least two signal transmission channels with driver units. Each driver unit is associated with a data network and has on its side facing away from the data network at least one logical signal input and at least one logical signal output. For a signal-transmitting coupling of each of the two data networks, the signal input or the signal output of the driver unit associated with one data network is connected with the signal output or signal input of the driver unit associated with the other data network through a coupling signal transmission channel.

The present invention relates in particular to systems in which the data networks are connected by beam waveguides. In this case in particular, the driver units connected between the data network and the connecting lead are conventional, with a beam transmitter and a beam receiver each being associated on the coupling lead pair side with one of the two terminals of a driver unit. CAN networks or other data networks operated in two-wire mode and connected by wires can be connected with such a system. Electrical isolation is produced when the beam waveguides are used as the coupling leads. Alternatively, coupling by a radio relay link can also be provided.

These lead-connected data networks typically contain a two-wire data bus to which a plurality of subscribers are connected. Driver units are provided as interfaces to control electronics, said units having, in addition to the two terminals for the push-pull signals of the data bus, a signal input for changing the level on the data bus and a signal output that outputs the signal state on the two data bus wires as a measured comparator function. Provided all the data subscribers have approximately the same potential at their power supplies, they are connected to a common bus line pair. For certain applications, such as in electric vehicles, high voltage systems, EMC "Absorberhallten" etc., or for covering large distances, it is necessary to connect two or more data networks with one another, preferably by using beam waveguide transmission systems. System-specific transmission problems involving positive feedback can result under these conditions. Problems such as feedback and self-holding effect are discussed for example in the book "CAN Controller Area Network: Basics and Practice," published by Wolfhard Lawrenz, Verlag Huthig GmbH, Heidelberg, 1994, Chapter 5.7, in conjunction with a so-called electrical repeater.

German Patent document DE 41 06 726 A1 describes a communications network for motor vehicles, used for data connection of a plurality of control devices and terminals, with the network being hybrid in structure and having a superior first electrical lead network to link the control devices with one another, as well as a plurality of subordinate beam waveguide networks each of which links a plurality of terminals with one of the control devices. Suitable opto-electrical converters are provided at the terminals and the control devices.

The basis of the technical problem solved by the present invention is to provide a circuit for signal-transmitting coupling of data networks of the above-described type, in which undesired transmission problems caused by feedback are suppressed, thus permitting smooth integration of several data networks via at least two signal transmission channels, especially a beam waveguide pair.

This goal is achieved according to the present invention by a circuit for coupling data networks over at least two signal transmission channels with driver units. Each driver unit is associated with a data network and has on its side facing away from the data network at least one logical signal input and at least one logical signal output. For a signal-transmitting coupling of each of the two data networks, the signal input or the signal output of the driver unit associated with one data network is connected with the signal output or signal input of the driver unit associated with the other data network through a coupling signal transmission channel. A logical coupling control unit is looped into the at least two coupling signal transmission channels. The control unit blocks the signal path on the other coupling signal transmission channel when predetermined blocking signal information appears on one of the coupling signal transmission channels.

The circuit according to the invention includes a logical coupling control unit looped into the (at least two) signal transmission channels, so that when predetermined blocking signal information appears as a serially transmitted blocking recognition pattern, for example a predetermined signal level or a predetermined sequence of signal levels, the control unit blocks the signal path on one signal transmission channel when the blocking pattern is received on the other signal transmission channel. This avoids the situation in which a dominant signal transmitted over one signal transmission channel, reflected from the driver unit on the receiver side, is transmitted back again over the other signal transmission channel, which would result in undesired blocking effects or astable or oscillating effects if improperly designed.

In a preferred embodiment, the circuit permits a delayed release of a blocked signal transmission channel after the predetermined signal level on the other signal transmission channel has ended. This ensures a reliable functioning of the circuit even in the case when the signals on the two coupling-lead-side terminals of the driver units, because of their internal circuit structure and because of transmission travel times, appear to be offset in time from one another by a certain amount. If necessary, immediate blockage of a signal transmission channel can also be provided.

One advantageous design according to the invention that is simple from a circuitry standpoint for the means for immediate blockage and for delayed release is provided by a logical coupling control unit including two control parts, each of which comprises a NAND gate looped into a respective signal transmission channel in the form of an electrical coupling lead, an input, and its output, as well as a circuit connected with the other input of the NAND gate. The circuit connects this gate input on the one hand through a parallel circuit composed of a resistance and a diode looped in the throughput direction away from the gate input with the opposite coupling lead and through a capacitor with the low voltage level supply. If immediate blockage is not required, the diodes can be eliminated.

Other objects, advantages and novel features of the present invention will become apparent from the following detailed description of the invention when considered in conjunction with the accompanying drawings.

DETAILED DESCRIPTION OF THE DRAWINGS

Figure 1:
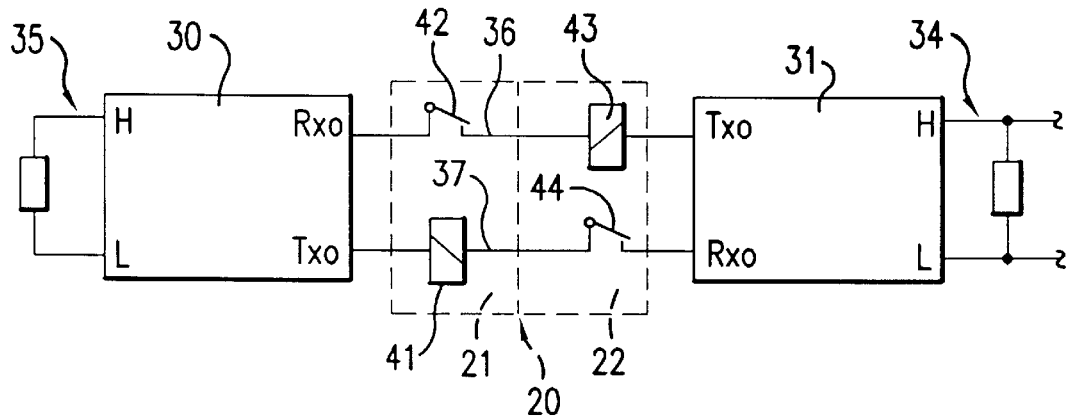
FIG. 1 is a schematic diagram according to the invention for coupling two CAN data networks with a logical coupling control unit.

In order to better understand the operation of the circuit according to the invention, the function of a conventional CAN driver unit will be described first with reference to FIGS. 4 and 5. Driver unit (1), according to FIG. 4, has one terminal for the H-level lead (11) and the L-level lead (12) of the corresponding CAN data bus. The leads are guided through a first resistance (11a) and a second resistance (12a), with a third resistance (13) connected between them. The values of these three resistances are suitably tuned to the internal resistances of driver unit (1) as well as a logical signal input ($Tx_O$) on the side facing away from the data network, said logical signal input controlling two bipolar transistors (14, 15) that function as switching elements through a corresponding circuit stage (16). The two transistor switches (14, 15) are switched to conduct when the lower of two logical signal levels is applied to signal input ($Tx_O$), for example a voltage of 0V. In this case, one transistor switch (14) connects the H-level lead (11) with the higher supply voltage, +5V for example, while the other transistor switch (15) connects the L-level lead (12) with the low supply voltage, 0V for example. A comparator (17) on driver unit (1) measures the difference in voltage between H-level lead (11) and L-level lead (12) and delivers it with a delay ($\tau$) characteristic of driver unit (1), represented by a corresponding delay stage (18), to a logical signal output ($Rx_O$) on the side of driver unit (1) facing away from the data network.

Figure 4:
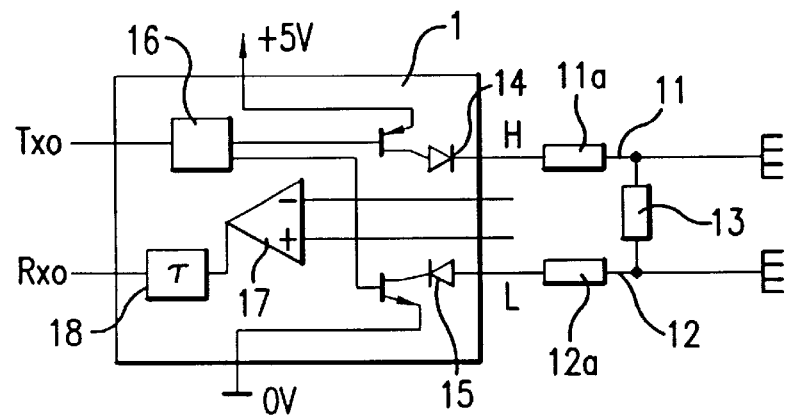
FIG. 4 is a schematic diagram of a conventional driver unit used in the systems in FIGS. 1 to 3 as an interface between a CAN data network and a pair of coupling leads.
Figure 5:
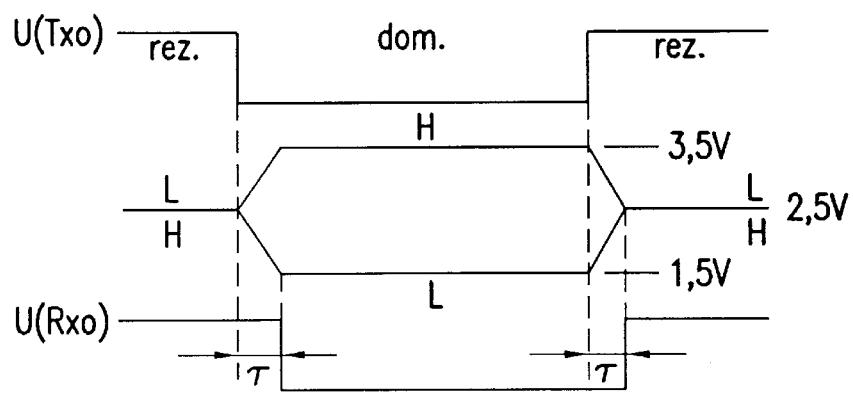
FIG. 5 shows curves of voltage as a function of time at the terminals of the driver unit in FIG. 4 to explain its function.

FIG. 5 shows the function of driver unit (1) in FIG. 4, in diagram form once again. The uppermost of the three level curves shown corresponds to the signal (U(TxO)) at the logical signal input ($Tx_O$), for example with the higher voltage level being assumed first that represents the recessive state (rez.) from which a change is then made for a predetermined period of time to the low voltage level that corresponds to the dominant state (dom.). In the middle part of FIG. 5, the time curve of the voltages on L-level lead (12) or H-level lead (11) of the connected CAN data network is shown. In the lower part of FIG. 5 the resultant voltage curve at the logical signal output ($Rx_O$) of driver unit (1) is shown. This voltage signal ($U(Rx_O)$) lags with a characteristic time delay ($\tau$) behind the voltage signal ($U(Tx_O)$) of the logical signal input ($Tx_O$).

Figure 6:
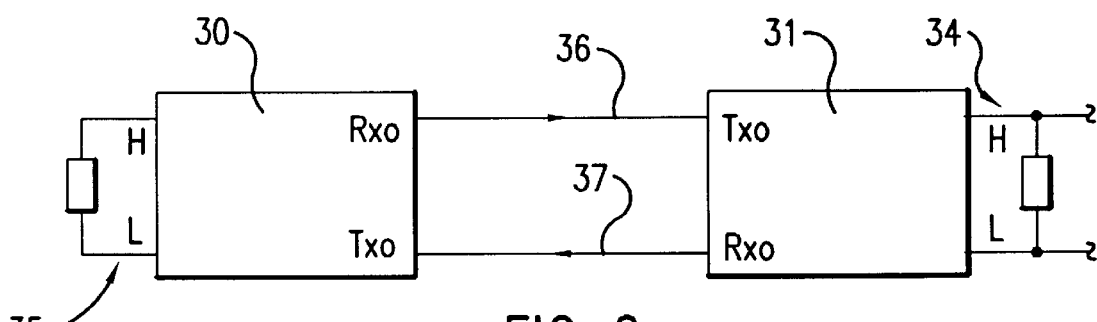
FIG. 6 is a schematic diagram of a circuit that is not protected against disturbing feedback effects, for coupling two CAN data networks.

FIG. 6 shows a circuit with two CAN driver units (30, 31) that are connected directly with one another without additional measures by means of a coupling lead pair (36, 37) in order to couple two associated CAN data networks (34, 35) with one another. In each case the logical signal input ($Tx_O$) of one driver unit is connected with the logical signal output ($Rx_O$) of the other driver unit, so that a directed signal transmission takes place into which a beam waveguide connection or an opto coupler can be incorporated without changing the function. This constitutes a four-wire transmission line built in the classical communications technology between two-wire data bus systems, with the ground return not being explicitly shown. This design suffers from the serious problem that decoupling of the outgoing signal from the incoming signal on the four-wire side is missing in each case, as in a fork circuit for example. As a result, the amplification of the four-wire circuit remains less than one, which is not the case for example in CAN driver units with their high-amplification comparators. The circuit in FIG. 6 instead changes to the dominant state upon the slightest impact and remains in that state, so that the two bus leads of each of the two coupled CAN networks (34, 35) are blocked.

This difficulty is overcome according to the invention by a circuit like that shown schematically in FIG. 1. In the circuit shown in FIG. 1, a logical coupling control unit (20) is looped into the pair of coupling leads (36, 37) provided for coupling two CAN data networks (34, 35). The leads (36, 37) connect the logical signal input ($Tx_O$) of one CAN driver unit (30 or 31) with the logical signal output ($Rx_O$) of the other CAN driver unit (31 or 30). The coupling unit (20) consists of two parts (21, 22), in each of which a relay has been selected to explain their function. In each case the relay control part (41, 43) is located in one coupling lead opposite the corresponding relay switch (42, 44) looped into the other coupling lead. Without limiting its general nature, the circuit is designed so that a dominant signal on one of the coupling leads (36, 37) allows the corresponding relay to respond, with the other transmission direction, i.e. the other coupling lead, being interrupted for the duration of the dominant signal. In the recessive state in which no current flows through the coupling lead pair (36, 37), both transmission directions are open, and nothing happens because the recessive voltage level at the logical signal input ($Tx_O$) of each driver unit (30, 31) has no effect on the connected CAN networks (34, 35). As a result, each CAN network has the ability to supply a dominant signal in this state, said signal being transmitted and reaching the opposite side. In this manner, the arbitration provided in the CAN system is completely guaranteed by evaluating the consequences of varying lengths of dominant or recessive address bits in an address block with a fixed length, even between coupled CAN network systems.

Figure 2:
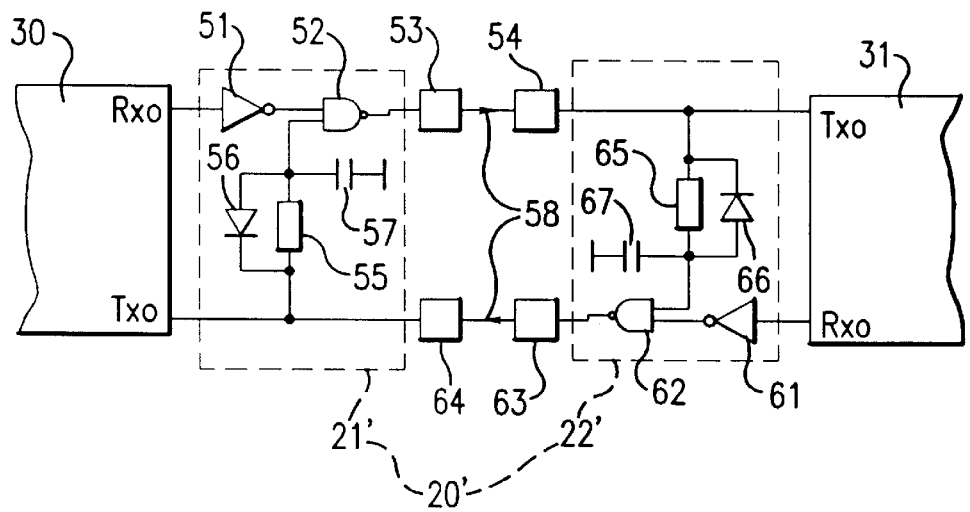
FIG. 2 is a diagram of a circuit constructed according to the invention on the basis of the schematic diagram shown in FIG. 1.

FIG. 2 shows a practical instance of putting into practice the circuit according to the invention, whose function is described schematically in FIG. 1. The circuit provides feedback suppression for the dominant signals. The coupling lead pair between the two CAN driver units (30, 31) in this case incorporates a beam waveguide section (58), with a beam waveguide transmitter (53, 63) being coupled on one side and a beam waveguide receiver (54, 64) being coupled on the other side on each of the two beam waveguides, suitably for the respective transmission direction. The beam waveguide receivers (54, 64) emit logical voltage signals that correspond to the logical voltage signals fed from the corresponding beam waveguide transmitters (53, 63) into the beam waveguide section (58). The two beam waveguide transmitters (53, 63) are each impacted by the output signals of a NAND gate (52, 62) made using CMOS technology for example, one of whose inputs is connected through an inverter (51, 61) with the respective logical signal output ($Rx_O$) of the corresponding driver unit (30, 31). The other input of the NAND gates (52, 62) is connected firstly through a parallel circuit composed of a resistance (55, 65) and a diode (56, 66) to the opposite coupling lead, more specifically to the logical signal input ($Tx_O$) of the driver unit in question (30 or 31), and secondly through a capacitor (57 or 67) to the low-voltage-level supply. Inverter (51 or 61), NAND gates (52 or 62), and the parallel circuit composed of resistance (55 or 65) and diode (56 or 66) as well as capacitor (57 or 67), in the circuit linkage described above, form the respective part (21' or 22') of the two-part logical coupling control unit (20') actually used in this specific embodiment.

For example, if CAN driver unit (30) receives a dominant signal from its corresponding CAN data network and the other driver unit (31) is in the recessive state, the higher voltage level is applied to the logical signal input (Tx$_0$) of the first driver unit (30) mentioned above, so that NAND gate (52) is unlocked and transfers the low signal level of the logical control signal output (Rx$_0$) of the first driver unit (30) mentioned above to beam waveguide transmitter (53), said signal corresponding to the dominant signal of the corresponding CAN network that is inverted in the corresponding inverter (51). The corresponding beam waveguide receiver (54) receives this signal and the capacitor (67) of the part of logical coupling control unit (20') that is located on this side (22') discharges quickly through diode (66), so that the NAND gate (62) of this part (22') of coupling control unit (20') is blocked without a noticeable delay. Thus, the signal path on the corresponding coupling lead is blocked and the signal level at signal input (Tx$_0$) of the first driver unit (30) mentioned above is held at the high voltage level for the duration of a dominant signal.

In contrast to the practically undelayed blockage of the opposite coupling lead, the elimination of this blockage, in other words the unlocking of the respective NAND gate (52 to 62), is delayed. This is achieved by the circuits of coupling control unit (20') that function as built-in release delay means, with the corresponding resistance (55, 65) and the respective capacitor (57 or 67) on the supply side of the respective NAND gate (52 or 62). This release delay is explained in the example shown in FIG. 3. Here, without limitation of its general nature, it is assumed that CAN driver unit (31) on the right side in FIG. 2 transmits a dominant signal (U(Rx$_0$)) over its signal output (Rx$_0$) to the signal input (Tx$_0$) of the other CAN driver unit (30); see the lowermost and uppermost curves in FIG. 3. As described above in conjunction with FIGS. 4 and 5, this signal appears with a time delay and is mirrored at the logical signal output (Rx$_0$) of left-hand driver unit (30); see the second curve from the top in FIG. 3. Without additional countermeasures, there would be a risk of this signal returning to the driver unit (31) on the right in FIG. 2 and to the NAND gate (62) located on this side, thus blocking the transmission direction from the right-hand (31) to the left-hand driver unit (30), which could result in undesired oscillation of the entire system.

Figure 3:
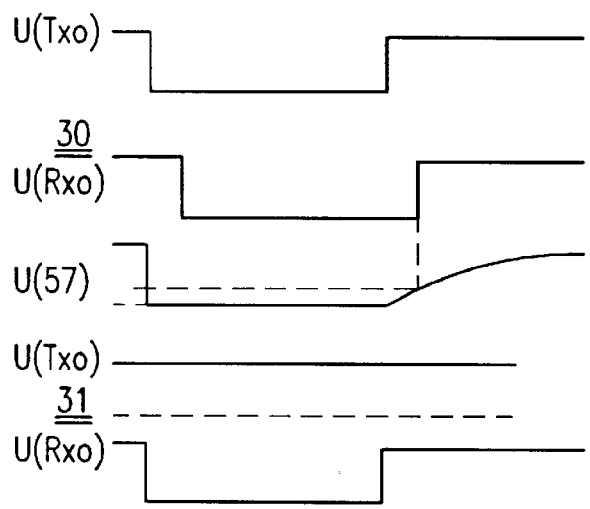
FIG. 3 shows curves of the voltage as a function of time at various points in the circuit of FIG. 2 to explain an example of a signal transmission.

The release delay circuit with the respective resistance (55, 65) and respective capacitor (57, 67) prevents this by virtue of the fact that the capacitor involved (57, 67) charges only slowly and with a delay through resistance (55, 65), so that following the end of a dominant signal transmitted on one coupling lead, the voltage at the corresponding input of the NAND gate located in the opposite coupling lead initially rises, with a time delay, back to the higher voltage level; see the middle graph in FIG. 3. Resistance (55, 65) and capacitor (57, 67) are dimensioned so that the respective time delay for a renewed release of controlled NAND gate (52 or 62) is at least as great as the time delay of the voltage signal that appears mirrored at the signal output (Rx$_0$) of driver unit (30), with respect to the signal arriving on its signal input (Tx$_0$). For the specific example in FIG. 3, this means that the delayed charging of the capacitor produces a voltage signal (U(57)) at the affected input of NAND gate (52) that reaches the signal level that again unlocks this NAND gate (52) only after the voltage signal (U(Rx$_0$)) at signal output (Rx$_0$) of driver unit (30) on the left in FIG. 2 has again reached its recessive high voltage level. As a result, the voltage (U(Tx$_0$)) at signal input (Tx$_0$) of driver unit (31) on the right in FIG. 2 remains continuously and undisturbed at the higher signal level, 5 volts for example, in contrast to a low signal level of 0 volts for example. The same obviously applies to the reverse signal transmission direction.

The circuit according to the invention described above therefore makes it possible to transmit signals on the coupling lead between the driver units of two CAN or other lead-connected two-wire data networks without any disturbing feedback or oscillating effects. It is understood that, instead of the release delay circuit specifically shown here, other circuit means with the same effect could be provided. With the circuit according to the invention, larger data network parts with a number of subscribers can be connected together and the time conditions can be met via suitable measures in the transition from the dominant to the recessive signal state. All disturbing feedback is filtered out and the technical cost of implementation is relatively low.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A circuit for coupling digital data networks, having driver units, providing only dominant and recessive signal levels, said digital data networks being coupled over a beam waveguide pair of signal transmission channels, each of said driver units being associated with one of said data networks and having on a side facing away from said one data network a logical signal input and a logical signal output, wherein for a signal-transmitting coupling of each data network, the logical signal input or the logical signal output of one of said driver units associated with said one data network is connected with the logical signal output or the logical signal input of another of said driver units associated with another of said data networks respectively through one of said pair of beam waveguide signal transmission channels, the circuit comprising:

a logical coupling control unit looped into said coupling pair of beam waveguide signal transmission channels, said control unit blocking a signal path on the other of said pair of beam waveguide signal transmission channels without any noticeable delay when the dominant signal level having priority over the recessive signal level appears on one of said pair of beam waveguide signal transmission channels.

2. The circuit according to claim 1, wherein said logical coupling control unit comprises means for delayedly releasing a blocked beam waveguide signal transmission channel after a termination of said dominant signal level on the other beam waveguide signal transmission channel.

3. The circuit according to claim 2, wherein said logical coupling control unit comprises two control parts, each of said two control parts comprising a NAND gate looped into a respective beam waveguide signal transmission channel in a form of an electrical coupling lead, an input, and an output, as well as a second circuit connected with another input of the NAND gate;

wherein said second circuit connects the NAND gate input on the one hand through a parallel circuit comprised of a resistance and a diode looped in a throughput direction away from the gate input with an opposite coupling lead and through a capacitor with a low voltage level supply.

4. A circuit for coupling data networks over at least two signal transmission channels having driver units, each of said driver units being associated with one of said data networks and having on a side facing away from said one data network at least one logical signal input and at least one logical signal output, wherein for a signal-transmitting coupling of each data network, the logical signal input or the logical signal output of one of said driver units associated with said one data network is connected with the logical signal output or the logical signal input of another of said driver units associated with another of said data networks respectively through one of said at least two signal transmission channels, the circuit comprising:

a logical coupling control unit looped into said at least two coupling signal transmission channels, said control unit blocking a signal path on another coupling signal transmission channel when predetermined blocking signal information appears on one of said coupling signal transmission channels;

wherein said logical coupling control unit comprises means for delayedly releasing a blocking signal transmission channel after a termination of a predetermined signal level on another signal transmission channel; and two control parts, each of said two control parts comprising a NAND gate looped into a respective signal transmission channel in a form of an electrical coupling lead, an input, and an output, as well as a second circuit connected with another input of the NAND gate;

wherein said second circuit connects the NAND gate input on the one hand through a parallel circuit comprised of a resistance and a diode looped in a throughput direction away from the gate input with an opposite coupling lead and through a capacitor with a low voltage level supply.

* * * * *